United States Patent [19]

Hoopes et al.

[11] Patent Number: 5,422,141
[45] Date of Patent: Jun. 6, 1995

[54] CORROSION INHIBITING COMPOSITION FOR REINFORCED CONCRETE AND METHOD OF APPLYING SAME

[75] Inventors: Robert J. Hoopes, Nashua, N.H.; Neal S. Berke, Chelmsford, Mass.; Paul G. Tourney, Acton, Mass.; Ahmad Arfaei, Chelmsford, Mass.

[73] Assignee: W.R. Grace & Co.-Conn., New York, N.Y.

[21] Appl. No.: 30,749

[22] Filed: Mar. 12, 1993

[51] Int. Cl.$^6$ ............ B05D 1/00; B05D 3/12; C09D 5/00
[52] U.S. Cl. ............... 427/299; 106/14.05; 106/14.13; 106/14.14; 106/14.15; 106/14.18; 106/14.41; 106/14.42; 106/14.43; 106/14.44; 427/403; 427/419.1; 427/419.5; 427/419.8
[58] Field of Search ............... 106/14.13, 14.14, 14.15, 106/14.18, 14.21, 14.44, 14.41, 14.42, 14.43, 14.05; 427/403, 299, 419.1, 419.5, 419.8

[56] References Cited

U.S. PATENT DOCUMENTS

| | | | |
|---|---|---|---|
| 4,026,723 | 5/1977 | Grof et al. | 106/315 |
| 4,092,109 | 5/1978 | Rosenberg et al. | 134/42 |
| 4,153,464 | 5/1979 | Sturwold et al. | 106/14.41 |
| 4,166,151 | 8/1979 | Jahnke | 106/14.41 |
| 4,398,959 | 8/1983 | Rosenberg et al. | 106/90 |
| 4,605,572 | 8/1986 | Omata et al. | 427/403 |
| 4,609,573 | 9/1986 | Omata et al. | 427/403 |
| 4,778,527 | 10/1988 | Ikunaga et al. | 106/14.41 |
| 5,039,556 | 8/1991 | Cogliano et al. | 427/136 |
| 5,092,923 | 3/1992 | Dillard et al. | 106/14.5 |
| 5,246,495 | 9/1993 | Helmstetter | 106/14.44 |

FOREIGN PATENT DOCUMENTS

| | | | |
|---|---|---|---|
| 468883 | 1/1992 | European Pat. Off. | 106/14.21 |
| 2504170 | 10/1982 | France . | |
| 2655060 | 5/1991 | France | 106/14.21 |
| 86074 | 11/1971 | Germany | 106/14.21 |
| 221453 | 4/1985 | Germany | 106/14.41 |
| 50016719 | 2/1975 | Japan . | |
| 54-072222 | 6/1979 | Japan . | |
| 1298185 | 1/1989 | Japan . | |
| 1257112 | 10/1989 | Japan . | |
| 0437672 | 7/1992 | Japan . | |

OTHER PUBLICATIONS

European Search Report-Application No. EP 94250064, dated 22 Jun. 1994; 4 pages.
J. A. Manson et al., "Long-Term Rehabilitation of Salt-Contaminated Bridge Decks", Transportation Research Board, National Research Council, Washington, D.C.; Apr. 1993; 41 pages.
Philip D. Cady, Richard E. Wyers, and David T. Wilson, "durability and compatibility of Overlays and Bridge Deck Substrate Treatments," *Concrete International*, Jun., 1984; pp. 36–44.

Primary Examiner—Anthony Green
Attorney, Agent, or Firm—Nicholas P. Triano, III; William L. Baker

[57] ABSTRACT

A rehabilitative solution for preventing or retarding the spread of corrosion of metal reinforcements in concrete, comprising a) one or more corrosion-inhibiting agent(s) and b) a impregnation-increasing amount of a penetration-enhancing agent selected from the group consisting of $C_1$ to $C_{20}$ alcohols; alkali metal salts of gluconic acid; alkyl-substituted benzene compounds; or mixtures thereof, is disclosed, along with several methods of its application for concrete rehabilitation.

25 Claims, No Drawings

CORROSION INHIBITING COMPOSITION FOR REINFORCED CONCRETE AND METHOD OF APPLYING SAME

FIELD OF THE INVENTION

This invention relates generally to the repair and rehabilitation of concrete structures which have been weakened due to corrosion of steel embedded therein. Particularly, the invention relates to a method for halting steel corrosion in weakened concrete whereby a solution of novel composition is applied to a smooth or scarified concrete structural surface.

BACKGROUND OF THE INVENTION

The present invention is directed to a method of rehabilitating and stabilizing salt-contaminated reinforced concrete structures, and a novel composition used in the method.

It is well known that reinforced concrete structures, such as bridges, parking garages, and the like are highly susceptible to corrosion and degradation from commonly applied chloride deicing salts. It is believed that a large percentage of all bridge decks in the United States, and in other countries which have cold climates, are seriously deteriorated because of corrosion of the reinforcing steel which is part of their structure. This corrosion is usually caused by chloride ions that have penetrated the concrete as a result of repeated application of deicing salts. The mechanism by which this corrosion and degradation occurs may be explained as follows:

Under highly alkaline conditions the reinforcing steel has formed upon it an oxidized film of $\gamma\text{-}Fe_2O_3$, which inhibits the corrosion of the steel material; the steel is thus said to have been "passivated". However, when chloride ions are introduced into the cementitious matrix, the passivated film is broken. (In concrete parking structures, for example, automobiles carry salt-contaminated ice and snow to the structure and, while parked, allow the contaminated ice and snow to melt, concentrating the salt on the concrete structure.) The breakage of the film generally occurs locally to expose the steel material. As a result, the smaller exposed part of the steel surface acts as an anode, and the larger portion, still covered by the passivated film, acts as a cathode to cause a large potential difference between them and, therefore, only the anode (smaller part) is corroded. As a result, so-called "pitting corrosion" takes place in spots on the surface of the steel.

The effective sectional area of the steel material is rapidly reduced by the pitting corrosion and such corrosion is therefore dangerous, even when the number of the spots is small. When the number of pits increases, they interconnect to finally spread all over the steel surface. In the initial stages of corrosion, ferrous hydroxide $(Fe(OH)_2)$ is formed. This compound is unstable and immediately oxidized into iron oxides such as $\alpha\text{-}FeOOH$ and $Fe_3O_4$, which are the main components of rust. In the course of the rust formation, the steel expands.

As such, a high expansion pressure is applied to the concrete matrix, forming cracks along the embedded rods. As cracks further develop in the concrete surface, additional chloride solution gets to the steel, accelerating corrosion and spalling of the concrete structure. If corrosion and spalling are allowed to continue, the metal reinforcements, as well as the surrounding concrete, deteriorate to a point which requires substantial removal and replacement of the entire structure. This is a difficult and costly endeavor.

Several methods have been suggested to ameliorate the condition of concrete structures which have undergone or are susceptible to corrosion deterioration. For example, low-permeability overlays have been applied to deteriorated structures. In such instances, spot repairs for severely deteriorated concrete is first accomplished. However, large areas of chloride-contaminated concrete remain in place and, although substantially slowed, corrosion and deterioration continue to occur. Thus, this method alone does not address the need for a long-term rehabilitation procedure.

A rehabilitation technique which is often used involves scarifying the top portion of, e.g., a bridge deck prior to application of a new overlay. Scarification to within 1.0 cm of the embedded reinforcement metal elements removes a major amount of contaminated concrete, permits impregnation of corrosion-inhibiting agents to the concrete around the steel reinforcements and then application of a new concrete overlay. A preferred mode requires complete removal of the concrete surrounding the steel reinforcements prior to applying a new overlay.

However, the corrosion-inhibiting compositions that have been used until now for impregnating concrete with corrosion-inhibiting agents have been somewhat limited in their ability to deliver the agents deeply into the concrete matrix. Another problem relates to even application of these compositions; when treating a concrete surface, e.g., by spraying, it is difficult for the applicator to determine whether the composition has been evenly applied.

As such, it is an object of the invention to provide improved corrosion-inhibiting compositions, and methods of applying them, that address these problems.

SUMMARY OF THE INVENTION

The present invention relates to a composition for preventing or retarding the spread of corrosion of metal reinforcements in concrete, comprising a solution of a) one or more corrosion-inhibiting agents; and b) a penetration-enhancing agent selected from the group consisting of $C_1$ to $C_{20}$ alcohols; alkali metal salts of gluconic acid; alkyl-substituted benzene compounds; and mixtures thereof, where the penetration-enhancing agent is present in an amount effective to increase the penetration of the corrosion-inhibiting agent(s) into the reinforced concrete matrix; and, preferably, an amount of a dye compound sufficient to visualize the area on a concrete structure upon which the aforesaid solution has been applied. In another preferred embodiment, the dye composition is one whose color fades in response to suitable stimuli, e.g., sunlight.

In its method aspects, the invention relates to a method for preventing or retarding the spread of corrosion of metal reinforcements in concrete, comprising the step of applying to the concrete a composition as just described. In a preferred embodiment, the reinforced concrete is scarified to remove salt-contaminated concrete; the composition of the invention is applied to the scarified area, and, thereafter, a cementitious overlay, preferably a corrosion-inhibiting cementitious overlay, is applied over the scarified area.

DESCRIPTION OF THE INVENTION

The present invention is directed to a composition and a method for rehabilitating reinforced concrete which has been found to effectively halt corrosion of the metal reinforcements in the concrete, counteracting the deleterious effects of road salt, etc. By "reinforced concrete" is meant concrete structures (such as bridges, roads, buildings and docks) which have steel rebar, wire mesh, or coiled metal elements embedded in the concrete matrix for the purpose of providing greater strength and rigidity to the concrete structure. As used herein, "concrete" is, for simplicity, meant to refer to all hard, rock-like masses formed from wet compositions comprising a cement binder; that is to say, pastes, mortars and concretes. The terms "paste", "mortar" and "concrete" are terms of art; pastes are mixtures composed of a hydraulic cement binder (usually, but not exclusively, Portland cement, and may also include fly ash, blast furnace slag, and silica fume) and water; mortars are pastes additionally including fine aggregate, and concretes are mortars additionally including coarse aggregate.

The composition of the invention is a rehabilitative solution which comprises one or more corrosion-inhibiting agents. The corrosion-inhibiting agents which may be used in the invention are well-known in the art, for example, alkali metal and alkaline earth metal nitrites; zinc nitrate; organic ammonium nitrites; alkaline earth metal petroleum sulfonates such as barium and calcium petronate; borate sails; molybdates; amine, e.g., quaternary amine, salts; alkanolamines; and mixtures thereof. Of these, the alkali metal and alkaline earth metal nitrites are preferred for use in the invention; the alkaline earth metal nitrites are particularly preferred, and calcium nitrite is more particularly preferred. The amount of the corrosion-inhibiting agent in the rehabilitative solution, generally, is at least about 5.0%. A range of about 5.0% to 75% may generally be employed, with 8.0% to 30% preferred, 10 to 25% more preferred, and 14 to 20% particularly preferred. (All component percentages expressed herein are, unless otherwise noted, % component by weight, based on the total weight of solution.)

The rehabilitative solution also comprises a penetration-enhancing agent selected from the group consisting of $C_1$ to $C_{20}$ alcohols; alkali metal salts of gluconic acid; alkyl-substituted benzene compounds; and mixtures thereof. It has been quite unexpectedly discovered that this penetration-enhancing agent enhances the penetration of the corrosion-inhibiting agent(s) into the reinforced concrete matrix. The amount of the penetration-enhancing agent necessary to enhance penetration of the corrosion inhibitor(s) will vary, depending on, e.g., the particular corrosion inhibitor(s) used in the rehabilitative solution, and the nature of the concrete being treated, e.g., its porosity, surface area, and density. However, it can be said that the amount of the penetration-enhancing agent, generally, is at least about 0.01%. A range of about 0.01 to 5.0% may generally be employed, preferably about 0.1 to 3.0%, and more preferably about 0.25 to 2.0%. The definition of "alcohol" herein is meant to encompass $C_1$ to $C_{20}$ aliphatic or aromatic mono- and polyhydric alcohols, e.g., di- and trihydric alcohols. $C_1$ to $C_6$ monohydric alcohols have been found effective, and methanol; ethanol; 1propanol; 2-propanol; 1-butanol; 2-butanol; 1-pentanol; 2-pentanol; 3-pentanol; hydroxybenzene; dihydroxybenzene; and mixtures thereof, are exemplary. $C_1$ to $C_6$ polyhydric alcohols have been found effective, and those which may be used include ethylene glycol; propylene glycol; glycerol; any one of the butane, pentane, or hexane polyols; or mixtures thereof. Ethylene and propylene glycol are preferred, and propylene glycol is particularly preferred. It should be noted that $C_{16}$ to $C_{20}$ polyvinyl alcohols may also be used as the penetration-enhancing agent. The metal salt of gluconic acid may be, for example, lithium gluconate, sodium gluconate or potassium gluconate, with sodium gluconate particularly preferred. Examples of alkyl-substituted benzene compounds which may be used are methylbenzene (toluene) and dimethylbenzene (xylene).

It should be noted that another, surprising, advantage of solutions of the invention containing $C_1$ to $C_6$ polyhydric alcohols is an enhanced bond strength of cementitious overlays to concrete treated with the rehabilitative solution. Therefore, methods for enhancing adhesion of such overlays, such as sandblasting, are not necessary when such rehabilitative solutions are employed.

The rehabilitative solutions of the invention may advantageously further comprise a dye compound. Such a dye is added to the solution in an amount effective to visualize the area of a concrete surface upon which the solution has been applied; this amount, generally, is at least about 0.1%. The use of a dye is beneficial, because it assists the worker who is spraying the rehabilitative solution in determining if the coating has been applied to the surface evenly. If certain areas of the surface are darker than others, then more rehabilitative solution can be directed to the lighter colored areas. Alternatively, one can apply the rehabilitative solution in a concentrated area, relying on the intensity of the color on the surface as a guide to how much has been applied. Also, once the carrier solvent of the solution has evaporated, the dye remains visible, making it possible for the technician to leave the job site for a desired time, then return and locate the treated area, e.g., if another coating of rehabilitative solution is to be applied. Any dye which allows such visualization may be used in the invention.

Advantageously, a dye which fades in response to certain stimuli, e.g., upon exposure to sunlight, may be used where permanent coloring of the surface would be aesthetically unacceptable, such as in cases where milling or scarification is undesired and the solution is simply applied to the neat concrete surface without further treatment, i.e., as a preventative measure. Such dyes are well-known, for example, "acid green WA", a mixture of acid blue 9 and acid yellow 23 (Tricon Colors, Inc., Elmwood Park, N.J.)

Although any solvent which will solubilize the ingredients described above and is compatible with hardened reinforced concrete may be used to prepare the rehabilitative solution, water is preferred for its low cost and environmental compatibility. The solution may be prepared by adding desired amounts of the dry components to water and mixing until the components are dissolved. Heat may be applied, if necessary, to aid in dissolution.

A particularly preferred rehabilitative solution according to the invention is a water solution comprising about 14 to 20% alkaline earth metal nitrite, about 0.25 to 2.0% propylene glycol, and at least 0.1% dye.

According to the method aspects of the invention, concrete rehabilitation is accomplished by applying the solution of the invention to concrete structural surfaces.

The solution may be applied by various methods; it may be sprayed, coated, e.g., with a brush or roller, or (on substantially horizontal surfaces) "ponded," whereby a puddle of the solution is formed on the concrete surface and allowed to soak in. Because of the ease and flexibility of application, spraying is a preferred technique for applying the solution to cement surfaces. The rehabilitative solution should be applied so as to achieve the goal of wetting the reinforcing steel with the corrosion-inhibiting agent, as the corrosion-inhibiting agent is responsible for immediately decreasing the steel reinforcement corrosion rate. In keeping with this, the rehabilitative solution is preferably applied in an amount sufficient to saturate the concrete matrix. Saturating the concrete matrix with rehabilitative solution also significantly increases the time the corrosion-inhibiting agent will remain effective around the reinforcing steel since it will increase the time it will take the corrosion-inhibiting agent to diffuse away from the steel into concrete that does not contain the agent. As such, three or four applications are particularly preferred. After each application, about one to four hours should be allowed for the corrosion-inhibiting agent to permeate into the concrete matrix. To enhance the impregnation of the rehabilitative solution into the concrete matrix, the concrete may be heated. Such techniques are known and are taught in commonly-owned U.S. Pat. No. 5,039,556, the disclosure of which is incorporated herein by reference.

Water and other debris should be kept away from the treated area(s) while the treated concrete is drying, as water may wash the corrosion-inhibiting agent away before it has a chance to impregnate the concrete matrix. However, once the concrete is dry, the impregnation of the corrosion-inhibiting agent may be enhanced by applying a coating of water to the concrete surface and allowing the water to soak in; this has been found to be an effective technique in 'forcing' the corrosion-inhibiting agent further into the concrete matrix. If water does wet the treated area while the coated concrete is drying, the concrete surface should be dried before the next application of rehabilitative solution. A suitable technique for doing this is to use a propane-fired infrared heater using a surface temperature of about 400° F.

The inventive solution may be used to treat reinforced concrete in a number of ways. First, applying the solution to reinforced concrete with no visible corrosion is a way to "inoculate" the concrete to prevent rebar corrosion, or halt or retard nascent corrosion. In this case the rehabilitative solution may be applied as described above, e.g., by spraying, coating with a brush or roller, or ponding. No surface preparation is necessary. However, if desired, the concrete surface may be grooved so as to increase the surface area, and enhance the penetration of the rehabilitative solution.

Second, in structures where corrosion is in more advanced stages, i.e., showing cracks with rust stains, or where portions of the concrete have fallen off, exposing the rebars, more drastic measures are needed, and the solution may be applied to areas where the corroded concrete has been removed in some fashion, after which a cementitious overlay, preferably a corrosion inhibiting cementitious overlay, is applied over the affected area.

This procedure involves first scarifying the concrete overlying the steel reinforcements. Milling of the concrete surface may be used where the concrete has been sufficiently contaminated by salt to warrant its removal, but the corrosion has not advanced to the point where extensive cracking or surface concrete loss has occurred. Milling is a simpler and more economical alternative to more intensive removal efforts, whereby a milling bit abrades, or "shaves", salt-contaminated surface concrete off to just expose the embedded reinforcements. Comparatively less concrete is removed in this manner. When the reinforced concrete is more severely salt-contaminated and corroded, however, more extensive concrete removal by such means as pneumatic hammering is necessary. In either case, once the scarification is complete, sand- or shotblasting can be used to remove any loose material before application of the rehabilitative solution.

After application of the rehabilitative solution as described herein, a cementitious overlay is applied over the treated scarified area to replace the concrete that has been removed, covering the rebars. The cementitious overlay may comprise conventional pastes, mortars and concretes; polymer concretes; latex-modified concretes; and low-permeability concretes such as gunite, shotcrete, and microsilica-modified concrete. A low-permeability concrete can significantly seal off the treated area from the elements; road salt is thus kept out, and the corrosion-inhibiting agent cannot (easily) diffuse from the treated area.

Preferably, the overlay is a corrosion-resistant cementitious composition which will act to prevent corrosion from occurring again in the rehabilitated structure. A preferred overlay comprises a corrosion-inhibiting agent which may be the same as or different than the corrosion-inhibiting agent of the rehabilitative solution, such as alkali metal and alkaline earth metal nitrites; zinc nitrate; organic ammonium nitrites; alkaline earth metal petroleum sulfonates such as barium and calcium petronate; borate salts; amine salts; alkanolamines; and mixtures thereof. More preferably, the corrosion-inhibiting agent in the overlay is an alkaline earth metal nitrite such as calcium nitrite. The corrosion-inhibiting agent is added to the wet overlay mix before placement. The amount added will depend on the amount of protection desired, but generally about 2.0% corrosion-inhibiting agent, based on the total hydraulic cement solids, is appropriate. Higher amounts of corrosion-inhibiting agent may be preferred, for example, as in U.S. Pat. No. 4,398,959, the disclosure of which is incorporated herein by reference, wherein a cementitious overlay comprising calcium nitrite in an amount of at least 20% by weight of the water in the wet overlay mix is taught.

Before the overlay is applied over a scarified area which has been treated with rehabilitative solution containing gluconate salts as the penetration-enhancing agent, sandblasting is recommended to enhance bond adhesion of the overlay. Otherwise, no sandblasting is necessary.

After the overlay has been placed, it should be allowed to moist cure for a suitable time period. Moist curing produces a more impermeable concrete and will help prevent drying shrinkage cracking. Typically, five to seven days is sufficient. A penetrating sealer, applied to the repair area after curing, is optional but desirable for further protection. Suitable sealers include silanes, siloxanes, and blends thereof.

The following examples are given for illustrative purposes only and are not meant to be a limitation on the claims. All component percentages are by weight, based on the total weight of solution, unless otherwise indicated.

EXAMPLE 1

A test was done to assess the effectiveness of rehabilitative solutions of the invention comprising a polyhydric alcohol in enhancing the bond strength of cementitious overlays. A water solution of 15% $Ca(NO_2)_2$, and 1% propylene glycol, was compared against a 15% solution of $Ca(NO_2)_2$, and no propylene glycol. The polyhydric alcohol-containing solution was sprayed onto three identically cured concrete half-cylinders, whereas four half-cylinders were treated with the non-polyhydric alcohol-containing solution. The half-cylinders were prepared by diagonally slicing, from the edge of one end, to the opposite edge of the other end, 181.6 mm × 363.2 mm concrete cylinders, which had been fog room cured for 28 days after casting, with a wet saw (to approximate the roughness of a milled surface). The saw-cut surfaces of all the half-cylinders were sprayed three times over a 24 hour period, completely saturating the surface with each application. Each half-cylinder was then placed into the cylindrical steel molds in which the cylinders were cast, and fresh concrete containing about 20 m/cm$^3$ $Ca(NO_2)_2$ was poured into the mold cavity. After 24 hours, the cylinders were removed from the molds and placed in a fog room for moist curing. After 72 hours in the fog room, the ends of the cylinders were capped and tested in compression using the Forhey compression machine. The average bond strength in the concrete samples treated with the polyhydric alcohol-containing solution was 12.86 mPa, whereas in the other samples, the average bond strength was 12.23 mPa. Thus, polyhydric alcohol-containing solutions of the invention can be seen to enhance the bond strength of cementitious overlays.

EXAMPLE 2

A test was done to assess the effectiveness of rehabilitative solutions of the invention comprising a polyhydric alcohol in enhancing the ingress of corrosion-inhibiting agents of the solution into concrete. A water solution of 15% $Ca(NO_2)_2$, and 1% propylene glycol, and a water solution of 15% $Ca(NO_2)_2$, and no propylene glycol, were prepared. 181.6 mm × 86.1 mm samples were sliced, with a wet saw, off 181.6 mm × 363.2 mm concrete cylinders made as in Example 1. The sliced cylinders were then dried overnight and weighed. At one end of each cylinder a dam was caulked to the side, and 50 g of solution was ponded within the dam on the cylinder end overnight. The treated ends were then cored at three locations with a 11.4 mm diameter coring bit, and nitrite analysis was conducted on cores of concrete obtained at a depth of from 22.7 to 45.4 mm. In the pieces treated with the polyhydric alcohol-containing solution, 15.54 kg $Ca(NO_2)_2/m^3$ concrete was present at these depths. In the pieces treated with the non-polyhydric alcohol-containing solution, 13.95 kg $Ca(NO_2)_2/m^3$ concrete was present at these depths. Therefore, it was noted that this solution of the invention, containing the polyhydric alcohol, was effective in promoting the ingress of corrosion inhibitor.

EXAMPLE 3

A separate test was done to assess the effectiveness of rehabilitative solutions of the invention comprising a gluconate salt in enhancing the ingress of corrosion-inhibiting agents into concrete. A water solution of 15% $Ca(NO_2)_2$ and 1% sodium gluconate, and a water solution of 15% $Ca(NO_2)_2$, and no gluconate, were prepared. The gluconate-containing solution was sprayed onto the flat longitudinal face of three 181.6 mm × 363.2 mm concrete half-cylinders, whereas four cylinders were treated with the non-gluconate-containing solution. (The half-cylinders were made as in Example 1.) The surfaces to be treated were sprayed three times over a 24 hour period, completely saturating the surface with each application. The treated surfaces of the half-cylinders were then cored at three locations as in Example 2. In the pieces treated with the gluconate-containing solution, 11.0 kg $Ca(NO_2)_2/m^3$ concrete was present at these depths. In the pieces treated with the non-gluconate-containing solution, 10.65 kg $Ca(NO_2)_2/m^3$ concrete was present at these depths. Therefore, it was noted that this solution of the invention, containing the gluconate, was effective in promoting the ingress of corrosion inhibitor.

What is claimed is:

1. A composition for rehabilitating reinforced concrete having steel reinforcements imbedded therein, comprising a solution of
   a) one or more corrosion-inhibiting agents present in an amount sufficient to inhibit corrosion of said steel reinforcements, said one or more corrosion-inhibiting agents selected from the group consisting of alkali metal and alkaline earth metal nitrites; zinc nitrate; organic ammonium nitrites; alkaline earth metal petroleum sulfonates; borate salts; molybdates; amine salts; alkanolamines; and mixtures thereof; and
   b) a penetration-enhancing agent selected from the group consisting of $C_1$ to $C_{20}$ alcohols; alkyl-substituted benzene compounds; and mixtures thereof, wherein said penetration-enhancing agent is present in an amount effective to increase penetration of said corrosion-inhibiting agent(s) into said reinforced concrete.

2. The composition of claim 1 further comprising a dye compound having a color present in an amount sufficient to visualize an area on a surface upon which said solution is applied.

3. The composition of claim 2 wherein the color of said dye compound fades upon exposure to sunlight.

4. The composition of claim 1 wherein said penetration-enhancing agents is a $C_1$ to $C_6$ monohydric alcohol selected from the group consisting of ethanol; 1-propanol; 2-propanol; 1-butanol; 2-butanol; 1-pentanol; 2-pentanol; 3-pentanol, and hydroxybenzene; and mixtures thereof.

5. The composition of claim 1 wherein said penetration-enhancing agent is a C1 to C6 polyhydric alcohol selected from the group consisting of ethylene glycol; propylene glycol; glycerol; butane, pentane, or hexane polyols; dihydoxybenzene; and mixtures thereof.

6. The composition of claim 1 wherein the amount of said corrosion-inhibiting agent(s) is from about 5.0 to 75% by weight, based on the weight of said solution.

7. The composition of claim 1 wherein the amount of corrosion-inhibiting agent(s) is from about 8.0 to 30% by weight, based on the weight of said solution.

8. The composition of claim 1 wherein the amount of said penetration-enhancing agent is from about 0.01 to 5.0% by weight, based on the weight of said solution.

9. The composition of claim 1 wherein the amount of said penetration-enhancing agent is from about 0.1 to 3.0% by weight, based on the weight of said solution.

10. The composition of claim 2 wherein said corrosion-inhibiting agent(s) is an alkaline earth metal nitrite in an amount of about 14 to 20%; said penetration-enhancing agent is propylene glycol in an amount of about 0.25 to 2.0%; and the amount of said dye compound is at least 0.1%.

11. A method of rehabilitating reinforced concrete, comprising the step of applying, to steel reinforcement-containing concrete to be rehabilitated, a solution comprising
   a) one or more corrosion-inhibiting agents present in an amount sufficient to inhibit corrosion of said steel reinforcements, said one or more corrosion-inhibiting agents selected from the group consisting of alkali metal and alkaline earth metal nitrites; zinc nitrate; organic ammonium nitrites; alkaline earth metal petroleum sulfonates; borate salts; molybdates; amine salts; alkanolamines; and mixtures thereof; and
   b) a penetration-enhancing agent selected from the group consisting of $C_1$ to $C_{20}$ alcohols; alkyl-substituted benzene compounds; and mixtures thereof, wherein said penetration-enhancing agent is present in an amount effective to increase penetration of said corrosion-inhibiting agent(s) into said reinforced concrete.

12. The method of claim 11 further comprising the step of scarifying said reinforced concrete surface before application of said solution.

13. The method of claim 12 wherein said scarifying step comprises milling of said concrete surface with a milling bit.

14. The method of claim 12 wherein said scarifying step comprises removal of said concrete to within about 1.0 cm of said steel reinforcements.

15. The method of claim 12 further comprising the step of applying a rehabilitating overlay to said scarified surface, after said application of said solution.

16. The method of claim 15 wherein said rehabilitating overlay contains a corrosion-inhibiting agent(s).

17. The method of claim 11 further comprising a dye compound having a color present in an amount sufficient to visualize an area on a surface upon which said solution is applied.

18. The method of claim 15 wherein the color of said dye compound fades upon exposure to sunlight.

19. The method of claim 11 wherein said penetration-enhancing agent is a $C_1$ to $C_6$ monohydric alcohol selected from the group consisting of ethanol; 1-propanol; 2-propanol; 1-butanol; 2-butanol; 1-pentanol; 2-pentanol; 3-pentanol, and hydroxybenzene; and mixtures thereof.

20. The method of claim 11 wherein said penetration-enhancing agent is a $C_1$ to $C_6$ polyhydric alcohol selected from the group consisting of ethylene glycol; propylene glycol; glycerol; butane, pentane, or hexane polyols; dihydroxybenzene; and mixtures thereof.

21. The method of claim 11 wherein the amount of said corrosion-inhibiting agent(s) is from about 5.0 to 75% by weight, based on the weight of said solution.

22. The method of claim 11 wherein the amount of said corrosion-inhibiting agent(s) is from about 8.0 to 30% by weight, based on the weight of said solution.

23. The method of claim 11 wherein the amount of said penetration-enhancing agent is from about 0.01 to 5.0% by weight, based on the weight of said solution.

24. The method of claim 11 wherein the amount of said penetration-enhancing agent is from about 0.1 to 3.0% by weight, based on the weight of said solution.

25. The method of claim 17 wherein said corrosion-inhibiting agent(s) is an alkaline earth metal nitrite in an amount of about 14 to 20%; said penetration-enhancing agent is propylene glycol in an amount of about 0.25 to 2.0%; and the amount of said dye compound is at least 0.1%.

* * * * *